US012594819B2

(12) United States Patent
Tian

(10) Patent No.: US 12,594,819 B2
(45) Date of Patent: Apr. 7, 2026

(54) SYSTEM AND METHOD FOR EXTREME COLD STARTING OF A HEATING SYSTEM

(71) Applicants: DENSO International America, Inc., Southfield, MI (US); DENSO CORPORATION, Kariya-city (JP)

(72) Inventor: Yilin Tian, Farmington, MI (US)

(73) Assignees: DENSO International America, Inc., Southfield, MI (US); DENSO CORPORATION, Kariya-city (JP)

( * ) Notice: Subject to any disclaimer, the term of this patent is extended or adjusted under 35 U.S.C. 154(b) by 4 days.

(21) Appl. No.: 18/594,807

(22) Filed: Mar. 4, 2024

(65) Prior Publication Data

US 2025/0178413 A1      Jun. 5, 2025

Related U.S. Application Data

(63) Continuation of application No. 18/594,622, filed on Mar. 4, 2024.

(60) Provisional application No. 63/604,508, filed on Nov. 30, 2023.

(51) Int. Cl.
B60H 1/32 (2006.01)
B60H 1/00 (2006.01)

(52) U.S. Cl.
CPC ....... B60H 1/3205 (2013.01); B60H 1/00314 (2013.01); B60H 1/00885 (2013.01); *B60H 2001/00949* (2013.01); *B60H 2001/3248* (2013.01); *B60H 2001/3255* (2013.01); *B60H 2001/3257* (2013.01); *B60H 2001/3272* (2013.01)

(58) Field of Classification Search
CPC .............. B60H 1/3205; B60H 1/00314; B60H 1/00885; B60H 2001/00949; B60H 2001/3248; B60H 2001/3255; B60H 2001/3257; B60H 2001/3272; B60H 1/32281; B60H 2001/00928; B60H 2001/325; B60H 1/32284; B60H 2001/00307; B60H 1/00278
USPC .......................................... 701/36
See application file for complete search history.

(56) References Cited

U.S. PATENT DOCUMENTS

| | | | |
|---|---|---|---|
| 11,073,313 B2 | 7/2021 | Senf, Jr. | |
| 2008/0295535 A1 | 12/2008 | Robinet et al. | |
| 2014/0374060 A1 | 12/2014 | Labaste Mauhe et al. | |
| 2017/0175743 A1 | 6/2017 | Dunn et al. | |
| 2018/0119597 A1* | 5/2018 | Styron ................... | F01P 7/165 |
| 2019/0070924 A1* | 3/2019 | Mancini ............ | B60H 1/32281 |
| 2020/0041071 A1* | 2/2020 | Werlen ...................... | F17C 5/06 |
| 2022/0305876 A1 | 9/2022 | Bidner et al. | |

(Continued)

FOREIGN PATENT DOCUMENTS

| | | |
|---|---|---|
| JP | 2002234335 A | 8/2002 |
| JP | 2019143916 A | 8/2019 |

*Primary Examiner* — Kira Nguyen
(74) *Attorney, Agent, or Firm* — Harness, Dickey & Pierce, P.L.C.

(57) ABSTRACT

A method and system are provided and include determining a sensed condition. When the sensed condition is below a first threshold and above a second threshold, the second threshold being less than the first threshold, a flow of coolant is started in a coolant loop comprising a first portion of a first heat exchanger. A flow of refrigerant is started in a refrigerant loop by starting a compressor within the refrigerant loop at a first speed.

20 Claims, 13 Drawing Sheets

(56) References Cited

U.S. PATENT DOCUMENTS

| | | | |
|---|---|---|---|
| 2023/0191868 A1* | 6/2023 | Zhang | F25B 5/04 |
| | | | 62/239 |
| 2024/0118023 A1* | 4/2024 | Minas | F17C 5/06 |
| 2025/0042218 A1* | 2/2025 | Guo | B60H 1/00921 |

* cited by examiner

SYSTEM AND METHOD FOR EXTREME COLD STARTING OF A HEATING SYSTEM

CROSS-REFERENCE TO RELATED APPLICATION

This application is a continuation application of U.S. application Ser. No. 18/594,622, filed Mar. 4, 2024, which claims the benefit of U.S. Provisional Application No. 63/604,508, filed on Nov. 30, 2023. The entire disclosures of the above applications are incorporated herein by reference.

TECHNICAL FIELD

The present disclosure relates to a heating system for a vehicle, and, more particularly, to a system for allowing the compressor to work at extremely low temperatures.

BACKGROUND

This section provides background information related to the present disclosure which is not necessarily prior art.

A coolant system is typically provided in a vehicle for cooling various components. For example, a coolant system is used for cooling the propulsion system of the vehicle. In electric vehicles, the coolant system may be used for cooling battery cells within a battery housing. The coolant system has coolant that flows through conduits to cool the desired components.

A vehicle typically also has a refrigerant system. The refrigerant system is part of a heating ventilation and air conditioning system for the vehicle to allow for occupant comfort. The refrigerant system typically includes a compressor that is electronically controlled. Many compressors do not operate in extreme cold temperatures. For a compressor, there is an operable temperature range due to electronics inside. At the compressor start, the low pressure side of the system will undershoot temperature and pressure. When ambient is extremely cold such as cold −35 C, an undershoot of 7 C can cause the compressor suction temperature to drop below the operating temperature such as no lower than −40 C while the ambient temperature is still in the operable range. Therefore, the heating system using compressor operable range will be further limited from hardware limitations due to system operation.

SUMMARY

This section provides a general summary of the disclosure and is not a comprehensive disclosure of its full scope or all of its features.

The present system provides a system and method for minimizing the undershoot of the refrigerant temperature during the starting of a compressor in the refrigerant system. The coolant in a coolant loop, such as a chiller loop, transfers heat to the refrigerant loop to minimize temperature undershoot. The coolant loop heat mass and temperature are indicative of the potential heat transfer amount.

In one aspect of the disclosure, a method for preventing temperature undershoot in a refrigerant loop during extreme temperatures includes determining a sensed condition and when the temperature is below a first threshold, starting a flow of coolant in a coolant loop comprising a first portion of a first heat exchanger. The method further includes raising the temperature of the coolant from a heat source to form heated coolant, communicating refrigerant through a second portion of the first heat exchanger, heating the refrigerant in the refrigerant loop at the first heat exchanger from the heated coolant and starting a flow of refrigerant in the refrigerant loop by starting a compressor within the refrigerant loop.

In another aspect of the disclosure, a system for preventing temperature undershoot in a refrigerant loop during extreme temperatures comprises a sensed condition sensor determining a sensed condition, a controller programmed to start flow of coolant in a coolant loop comprising a first portion of a first heat exchanger when the sensed condition is below a threshold to raise the temperature of the coolant from a heat source to form heated coolant. The controller is also programmed to start a flow of refrigerant in the refrigerant loop by starting a compressor within the refrigerant loop to communicate refrigerant through a second portion of the first heat exchanger to heat the refrigerant in the refrigerant loop at the first heat exchanger from the heated coolant.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
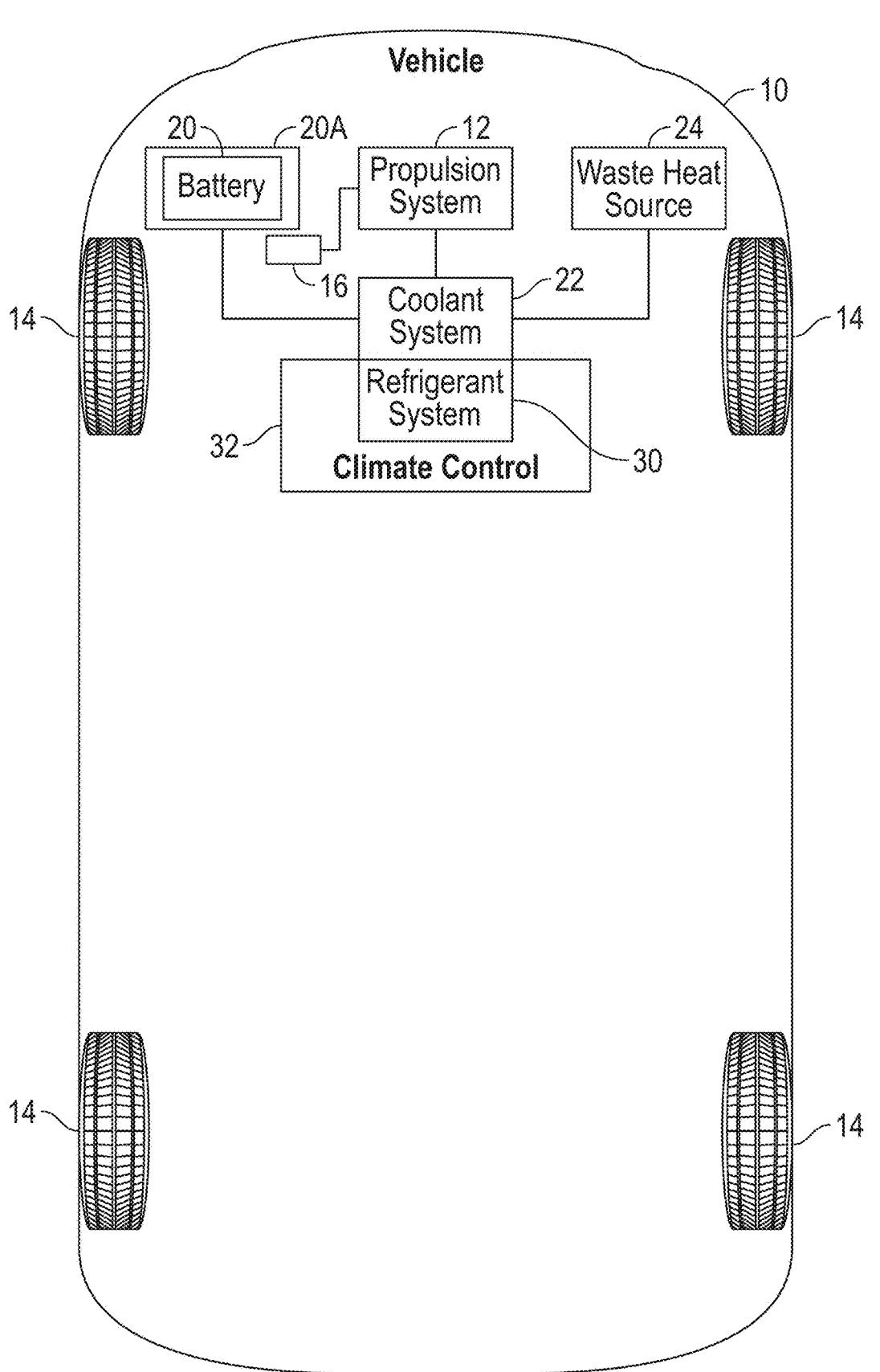
FIG. 1 is a block diagrammatic view of a vehicle having system of the present disclosure.

Referring now to FIG. 1, a vehicle 10 is illustrated having various components. Although a passenger vehicle is illustrated, the present teachings apply to other types of vehicles including trucks, sport utility vehicles, recreational vehicles, marine vessels, aircraft, trains and the like.

The vehicle 10 has a propulsion system 12 that is used to provide power to the wheels 14 of the vehicle 10. The propulsion system 12 is illustrated simply but may represent various types of propulsion systems including internal combustion, hydrogen and battery electric vehicles. Depending on the type of system, different ways for coupling to the wheels 14 may be provided. Further, the propulsion system 12 is coupled to each of the wheels 14. However, less than all of the wheels 14 may be propelled by a propulsion system 12. The propulsion system 12 includes an actuator 16, such as a throttle, which receives an input to control the propulsion system 12 from the vehicle operator.

The vehicle 10 also includes a battery 20 disposed within a battery housing 20A. The battery 20 has a plurality of cells that may be heated or cooled by passing coolant fluid through the battery housing 20A from a coolant system 22. The coolant system 22 may also be used to cool the propulsion system 12 by passing coolant therethrough. A waste heat source 24 may also be in fluid communication with the coolant system 22. The waste heat source 24 may be used to warm the coolant in the coolant system 22 as described in greater detail below. The waste heat source 24 may comprises various components.

The vehicle 10 also has a refrigerant system 30 that is part of the climate control system 32 of the vehicle 10. The refrigerant system 30 circulates refrigerant to heat or cool the passenger compartment of the vehicle 10.

Figure 2A:
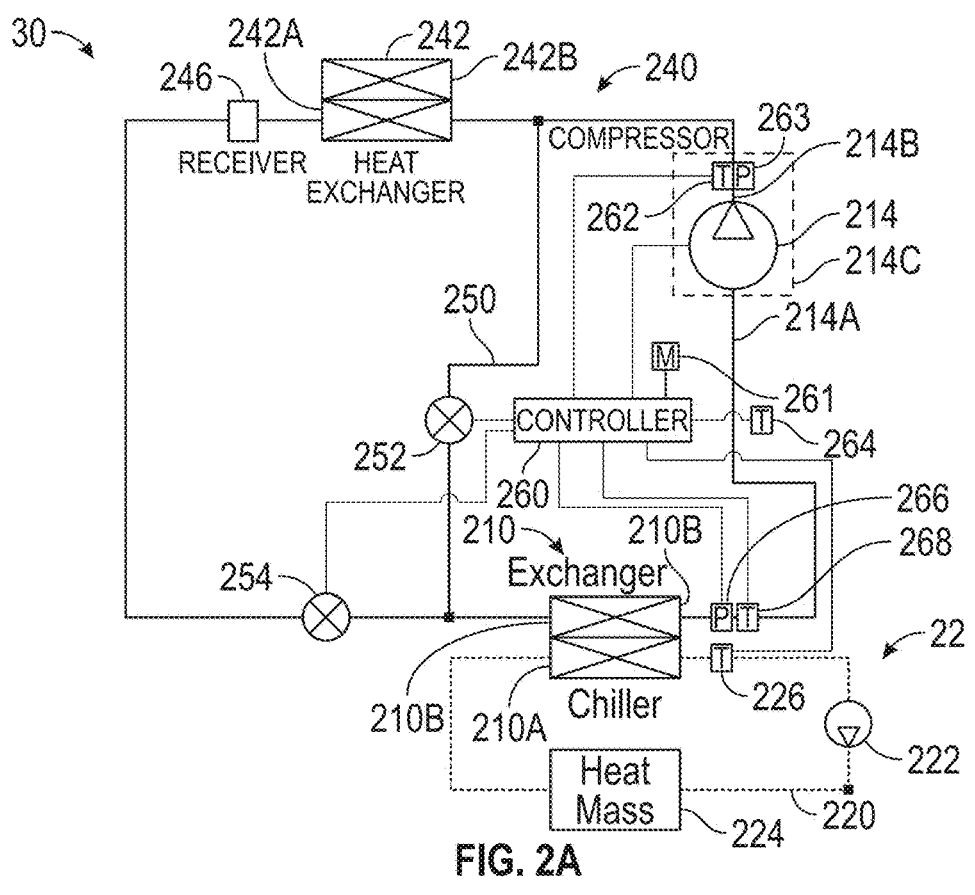
FIG. 2A is a first example of a coolant loop and refrigerant loop together with the controller for operating the system.

Referring now to FIG. 2A, the refrigerant system 30 and the coolant system 22 may be thermally coupled. In the present example, a first heat exchanger 210 is provided. In this example, the first heat exchanger 210 may be referred to as a chiller. The first heat exchanger 210 has a first portion 210A that is fluidically coupled to the coolant system 22. A second portion 210B of the first heat exchanger 210 is fluidically coupled to the refrigerant system 30. The first heat exchanger 210 allows heat in the coolant system 22 to warm the refrigerant in the refrigerant system 30 upon start-up to reduce the undershoot of a compressor 214.

The coolant system 22 has a coolant loop 220 that is formed from coolant conduits so that the coolant inside circulates and flows through the first portion 210A of the heat exchanger 210. In this example, a coolant pump 222 is disposed within the coolant loop 220. Oftentimes, the coolant pump 222 is referred to as a water pump even though the coolant may not be composed of water. The coolant loop 220 may also include a heat mass 224. The heat mass 224 may correspond to the waste heat source 24 described in FIG. 1. The waste heat source 24 may include the battery and another type of heat source disposed within the vehicle. The waste heat source 24 may also be the battery housing 20A of FIG. 1.

A temperature sensor 226 may also be disposed in the coolant conduits of the coolant loop 220. The temperature sensor 226 generates a temperature signal corresponding to the temperature of the coolant within the coolant loop 220. Other components may also be included within the coolant loop 220.

The refrigerant system has a refrigerant loop 240 that is formed of refrigerant conduit that fluidically interconnects the various components. The refrigerant loop 240 communicates fluid through the second portion 210B of the first heat exchanger 210. The refrigerant loop also has the compressor 214 that moves the fluid to flow through the refrigerant loop 240. The compressor has a low pressure side 214A and a high pressure side 214B. The compressor moves refrigerant from the low pressure side 214A to the high pressure side 214B.

In the present example, the refrigerant loop 240 has a second heat exchanger 242 that has a first portion 242A and a second portion 242B. A receiver 246 is fluidically coupled within the refrigerant loop 240 adjacent to the heat exchanger 242. The receiver 246 may be disposed at the outlet of the first portion 242A of the second heat exchanger 242B. The receiver 246 acts as an accumulator to accumulate the refrigerant in the refrigerant loop 240. The refrigerant is communicated from the first portion 242A and the receiver 246 to the second portion 210B of the second heat exchanger 210. The refrigerant is then communicated back to the compressor.

A hot gas bypass circuit 250 may also be provided. The hot gas bypass circuit 250 has a first valve 252. A second valve 254 is disposed in the refrigerant loop 240. By controlling the valves 252, 254 in an open or closed state, the compressor 214 may communicate the gaseous refrigerant through the bypass circuit 250 which prevents the refrigerant from flowing through the heat exchanger 242. That is, when the valve 252 is in the open state and the valve 254 is in the closed state, refrigerant recirculates from the compressor 214 through the valve 252 and through the second portion 210B of the refrigerant loop 240. The valve may be opened or closed depending on the operating conditions.

Electrically, a controller 260, that is microprocessor-based, is used to control the operation of the system. The processor of the controller 260 is coupled to a memory 261. The memory 261 is a non-transitory computer readable medium that has machine readable instructions that allow the processor or controller 260 to operate as described below. The controller 260 may be dedicated to the system or part of another vehicle system. The controller 260 receives input from a temperature sensor 262 that is disposed at the compressor 214. The temperature sensor 262 generates a temperature signal corresponding to the temperature of the refrigerant. The temperature sensor 262 may be incorporated within the circuitry of the compressor 214 or may be a standalone temperature sensor. A temperature sensor 268 may also be positioned at other locations such as the low pressure side 214A. The temperature sensors 262, 268 generate a temperature signal corresponding to the temperature within the refrigerant loop 240. The compressor 214 may have a compressor housing 214C in which the temperature sensor 262 and or/a refrigerant pressure sensor 263 is disposed. In one example, the temperature sensor 262 may be incorporated into a circuit board of the control electronics of the circuit. The pressure sensor 263 may be used to trigger the system as described below. That is, a direct pressure reading may be used. However, a saturation temperature calculated from the pressure may be used to initiate the process as well.

A vehicle or ambient temperature sensor 264 may be used to determine the temperature within or around the vehicle to control the system. The controller 260 may also be in communication with the valves 252, 254 to control the operation thereof as described above.

The controller 260 is also in communication with the temperature sensor 226 that generates a temperature signal corresponding to the temperature of the coolant within the coolant loop 220.

The controller 260 is also in communication with a pressure sensor 266 that is disposed adjacent to the first heat exchanger 210. The pressure sensor 266 generates a pressure signal corresponding to the pressure at the low pressure side of the compressor 214. The temperature signal from the temperature sensor 268 corresponds to the temperature of the refrigerant within the refrigerant loop 30 at the low pressure side of the compressor 214.

Figure 2B:
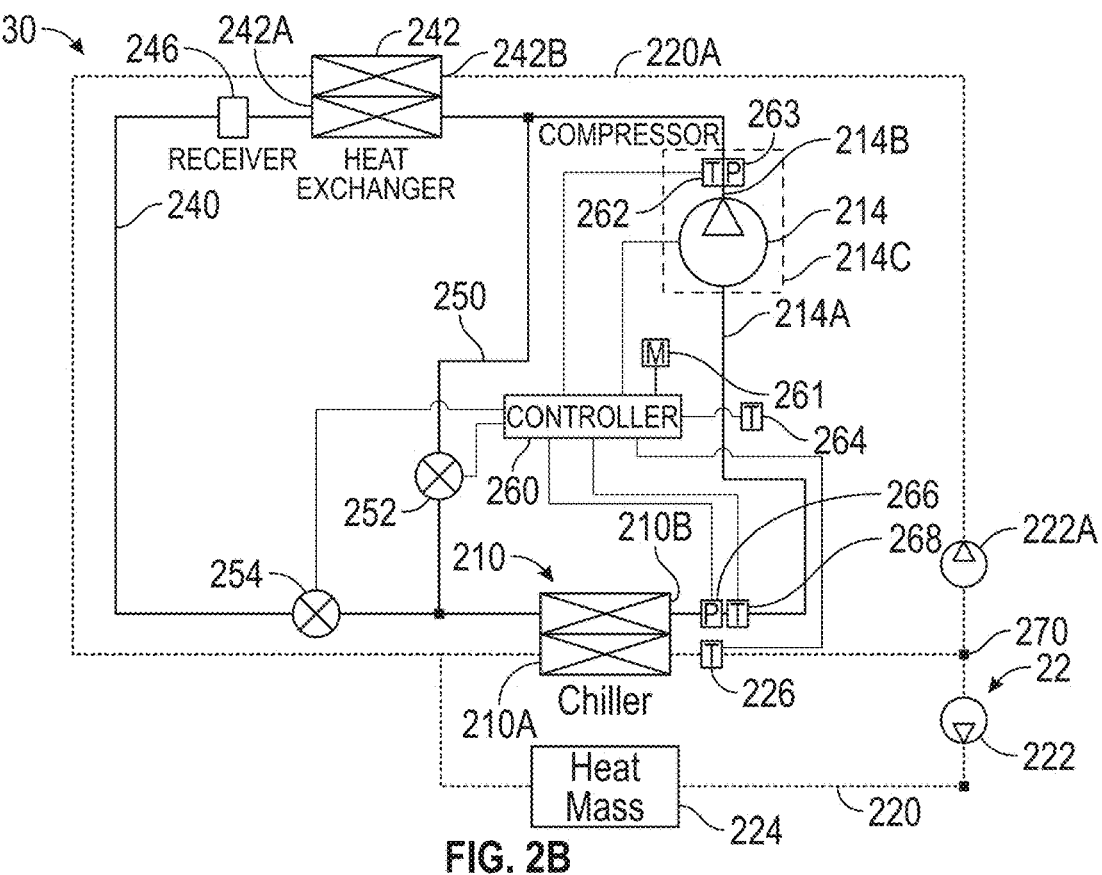
FIG. 2B is a second example of a system having a second coolant loop.
Figure 2C:
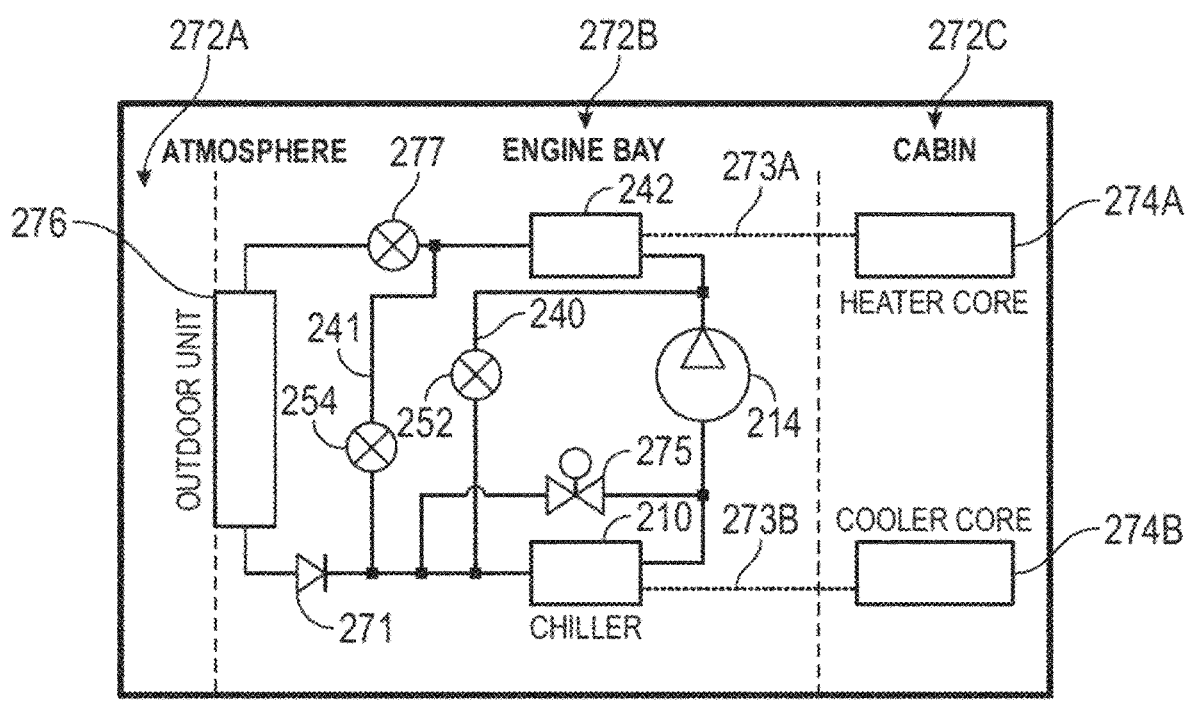
FIG. 2C is a third example of a coolant and refrigerant loop.

Referring now to FIG. 2B, a second coolant loop 220A may be independent or partially overlapping the coolant loop 220. The second coolant loop 220 communicates fluid to the second portion 242B of the heat exchanger 242. A second coolant pump 222A is in fluid communication with the first coolant loop 220 and communicates coolant through the second heat exchanger 242 toward the waste heat mass 224 and back through the first heat exchanger 210. The fluid that is communicated through the second portion 210A of the first heat exchanger 210 is divided at a T-section 270 where some of the fluid is communicated with the first coolant pump 222 in a first direction for the first coolant loop 220. At the T-section 270, coolant is also communicated through the coolant pump 222A and through the second heat exchanger 242 as described above in the second coolant loop 220A.

Referring now to FIG. 20, the refrigerant loop 240, 241 and coolant loops 273A, 273B are illustrated relative to the atmosphere 272A, the engine bay 272B and the cabin 272C. In this example, coolant loops 273A, 273B extend between the engine bay and a heater core 274A and a cooler core 274B, respectively. The valves 252, 254 in the refrigerant loop are similar to that illustrated above. However, a bypass valve 275 bypassing the first heat exchanger 210 is illustrated.

An outdoor unit 276 is illustrated in the atmosphere portion 272A. The outdoor unit 276 may act as an outside heat exchanger. An additional valve 277 used together with valve 254 is provided between the heat exchanger 242 and the outdoor unit 276 to allow selective use of the outdoor unit 276. A backflow preventer 271 prevents the refrigerant from flowing clockwise back into the outdoor unit 276.

Figure 2D:
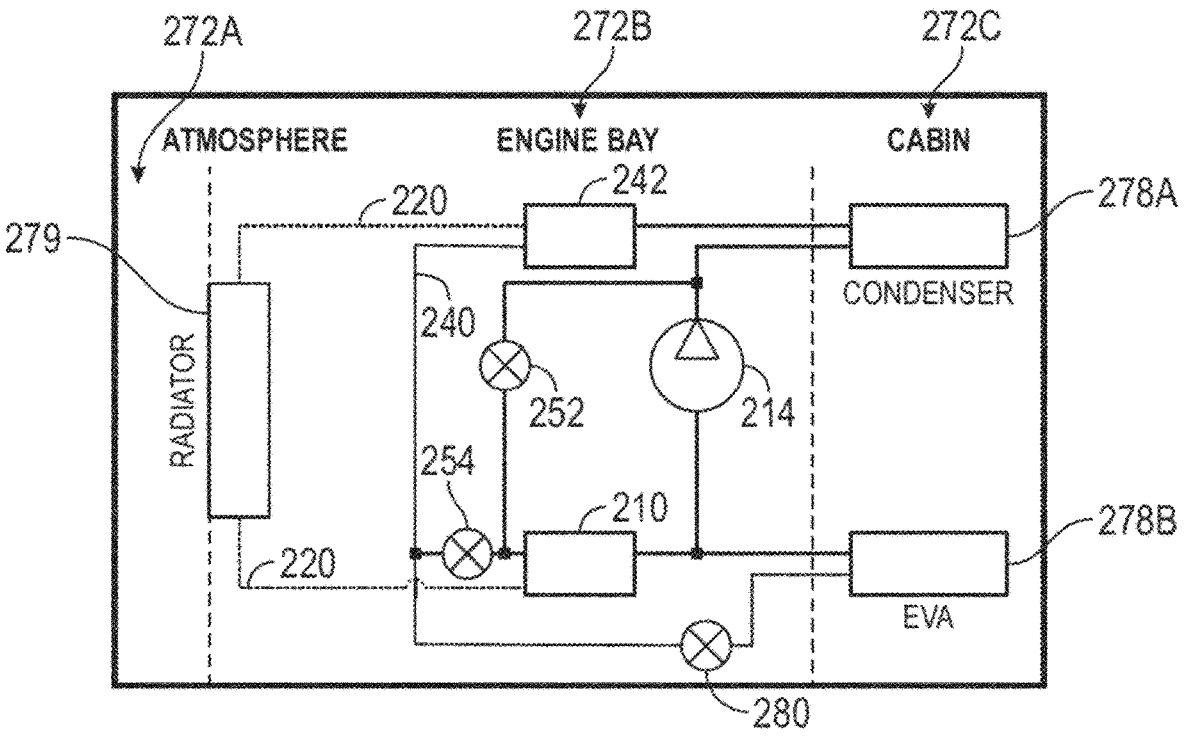
FIG. 2D is a fourth example of a coolant and refrigerant loop.

Referring now to FIG. 2D, yet another example of a system having coolant loop 220 and refrigerant loop 240 illustrated relative to the atmosphere 272A, the engine bay 272B and the cabin 272C. In this example, a condenser 278A and an evaporator 278B are disposed within the refrigerant loop 240. A radiator 279 is set forth in the atmosphere 272 that receives coolant that flows to either the first heat exchanger 210 and/or the second heat exchanger 242. The refrigerant in conduits of the loop 240 is circulated from the condenser 278A to the heat exchanger 242. Refrigerant is also circulated from the heat exchanger 242 to the evaporator 278B and back to the compressor 214. The refrigerant fluid path between the heat exchanger 242 and the evaporator 278B may have a valve 280 disposed therein so that heating and cooling process of the cabin can be achieved. Refrigerant through evaporator 278B is communicated back to the compressor 214 in a parallel loop to loop.

Figure 2E:
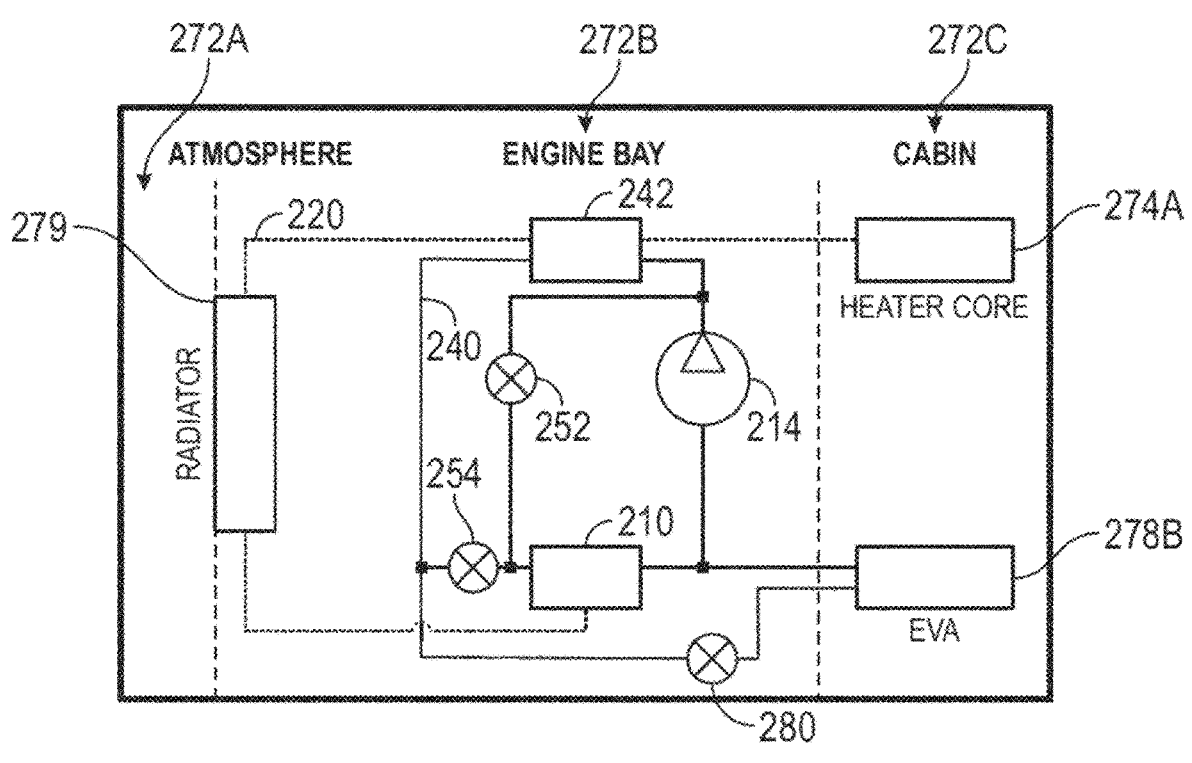
FIG. 2E is a fifth example of a coolant and refrigerant loop.

Referring now to FIG. 2E, a similar configuration to that set forth in FIG. 2D is provided. In this example, the condenser is replaced by the heater core 274A and coolant is communicated from the heater core 274A through any combination of the heat exchanger 242, the radiator 279 and the first heat exchanger 210. The evaporator 278B is configured in the same manner set forth at FIG. 2D.

Figure 2F:
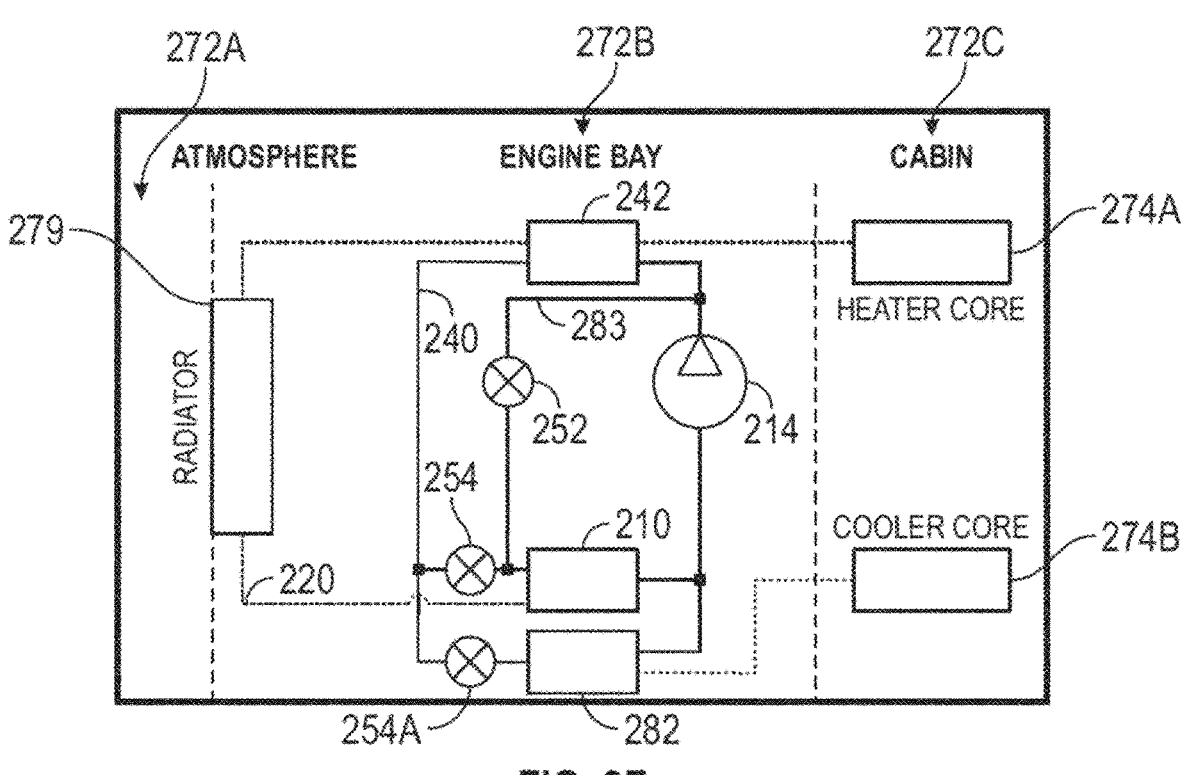
FIG. 2F is a sixth example of a coolant and refrigerant loop.

Referring now to FIG. 2F, a heat core 274A and a cooler core 274B are used in combination with three heat exchangers 210, 242, as described earlier. However, another heat exchanger 282 is provided. The heat exchanger 282 is in fluid communication with the cooler core 274B between which coolant is exchanged. Likewise, the heater core 274A is in fluid communication with the heat exchanger 242 which, in turn, is in fluid communication with the radiator 279. The radiator 279 has coolant that is communicated to the first heat exchanger 210. The refrigerant path from the heat exchanger 242 includes both the heat exchanger 210 and 282. The valve 254 is selectively used for communicating refrigerant to the first heat exchanger 210. The valve 254A is used for selectively communicating refrigerant to the heat exchanger 282. The refrigerant leaves the heat exchangers 210, 282 and is communicated to the compressor 21 and back to heat exchanger 242. In FIG. 2F, the fluid path has a fluid path 283 that extends from the compressor 214 to the position between the valve 254 and the first heat exchanger 210.

Figure 2G:
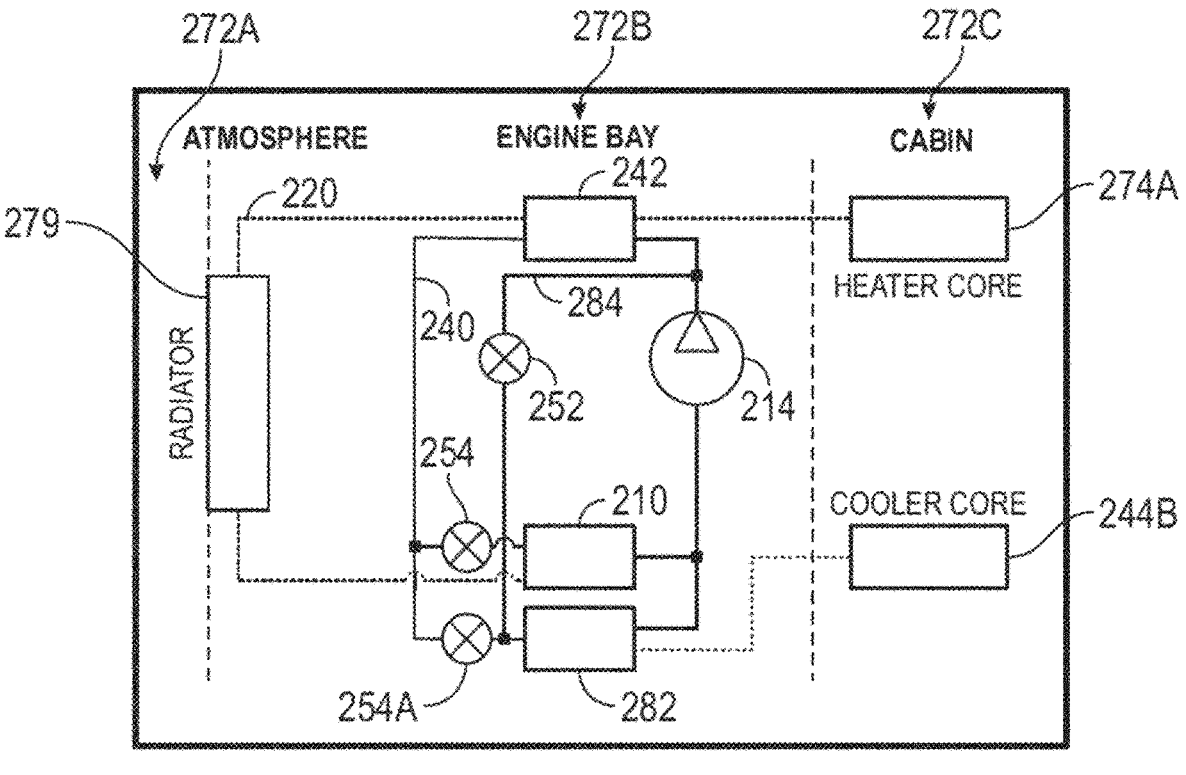
FIG. 2G is a seventh example of a coolant and refrigerant loop.

Referring now to FIG. 2G, a similar example to that set forth in FIG. 2F is provided. However, in this example, the fluid path 283 is replaced by fluid path 284. The fluid path 284 is provided from between the compressor 214 and the heat exchanger 242 to the position between the valve 254A and the heat exchanger 282.

Figure 3A:
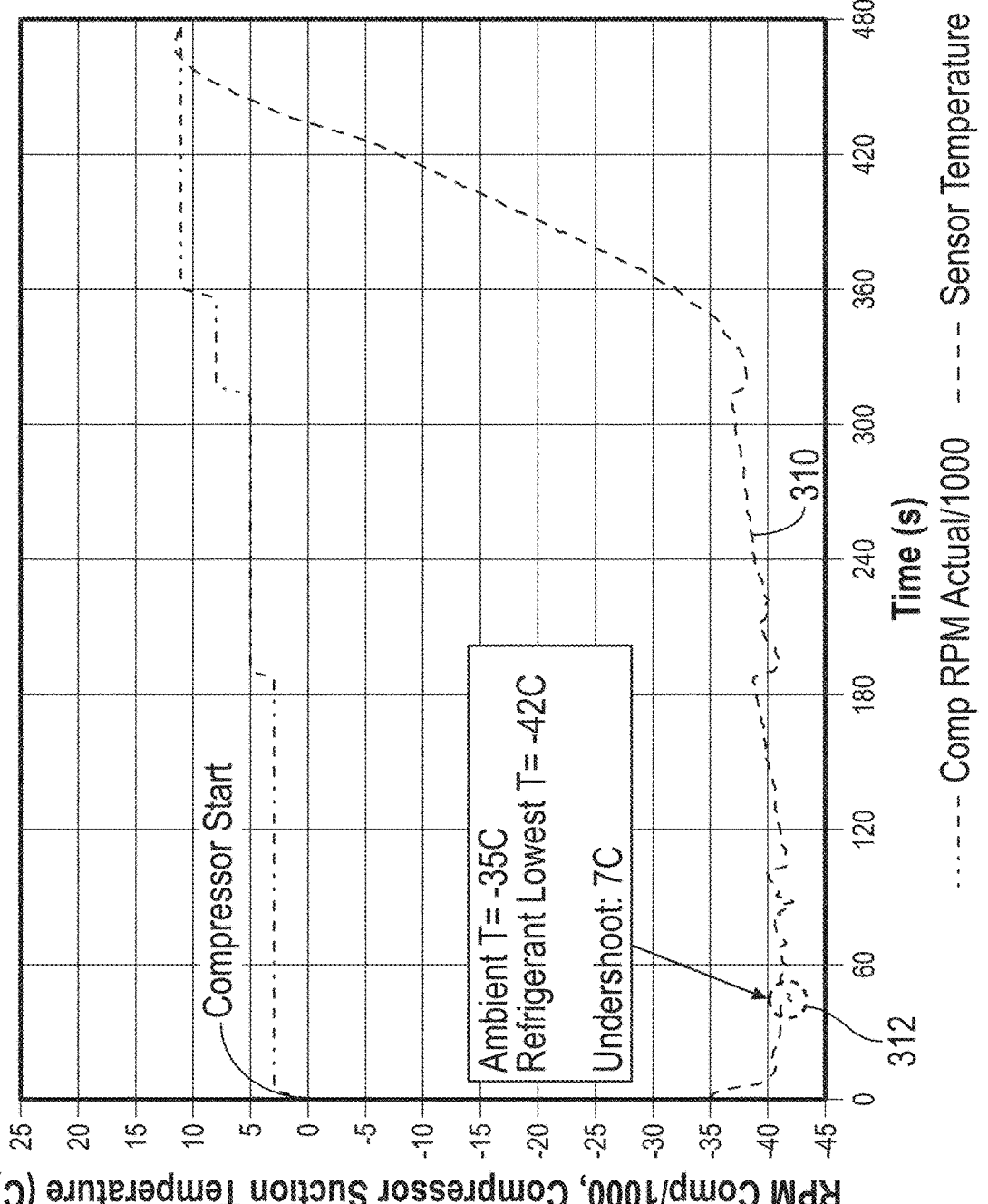
FIG. 3A is a plot of compressor speed and the first heat exchanger temperature in the system illustrating 7° C. undershoot for a prior system.

Referring now to FIG. 3A, the compressor speed in rpms is illustrated along with the temperature signal from the temperature sensor 268 of the refrigerant loop 30 for a prior system. The temperature of the sensor is illustrated as 312. In the portion 310, an overshoot is illustrated dropping 7° C. upon startup of the compressor.

Figure 3B:
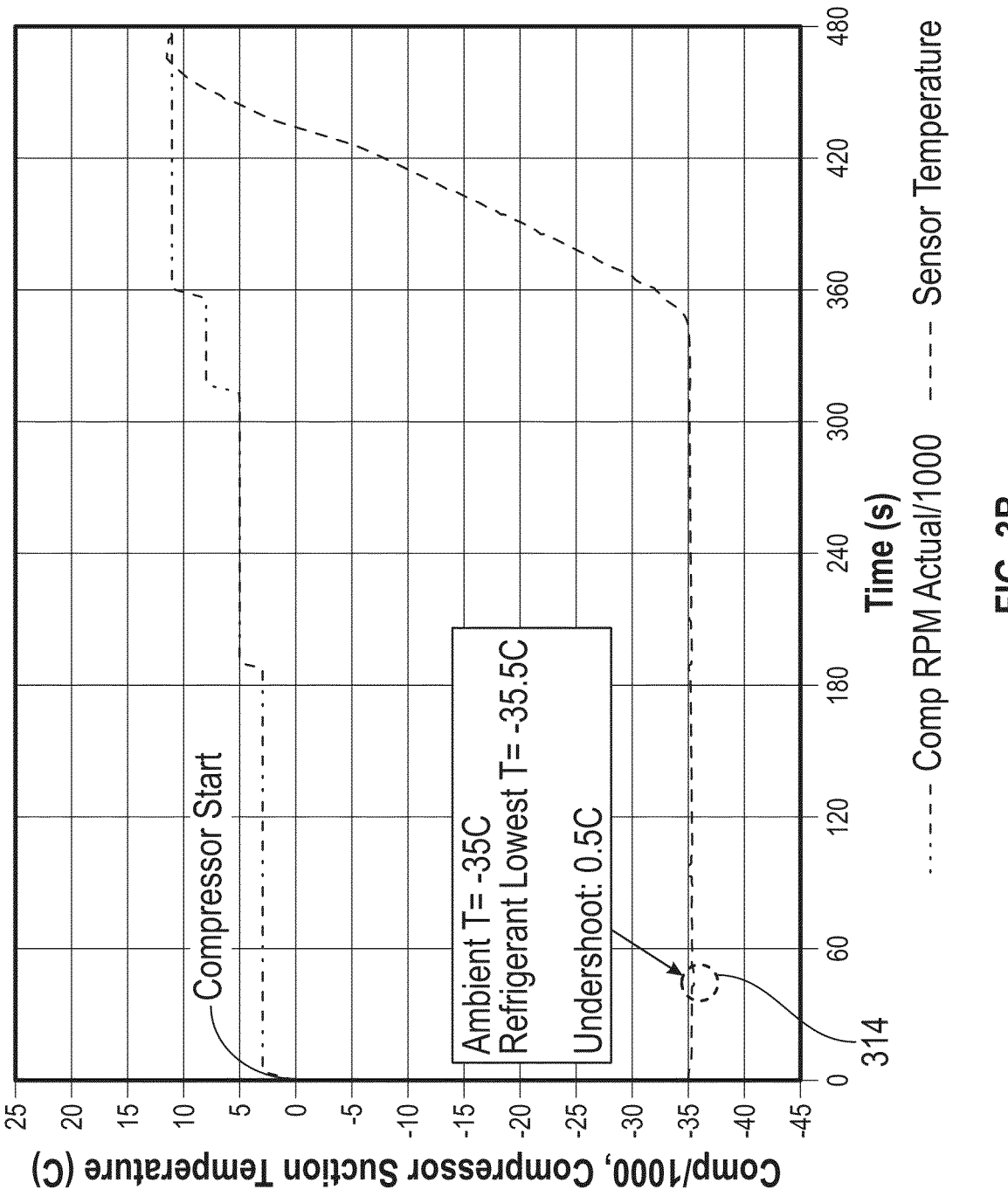
FIG. 3B is a plot of temperature within the system illustrating a 0.5 C undershoot while using the present system.

Referring now to FIG. 3B, at 314, the undershoot of the input temperature to the compressor using the present system is 0.5° C.

Figure 4A:
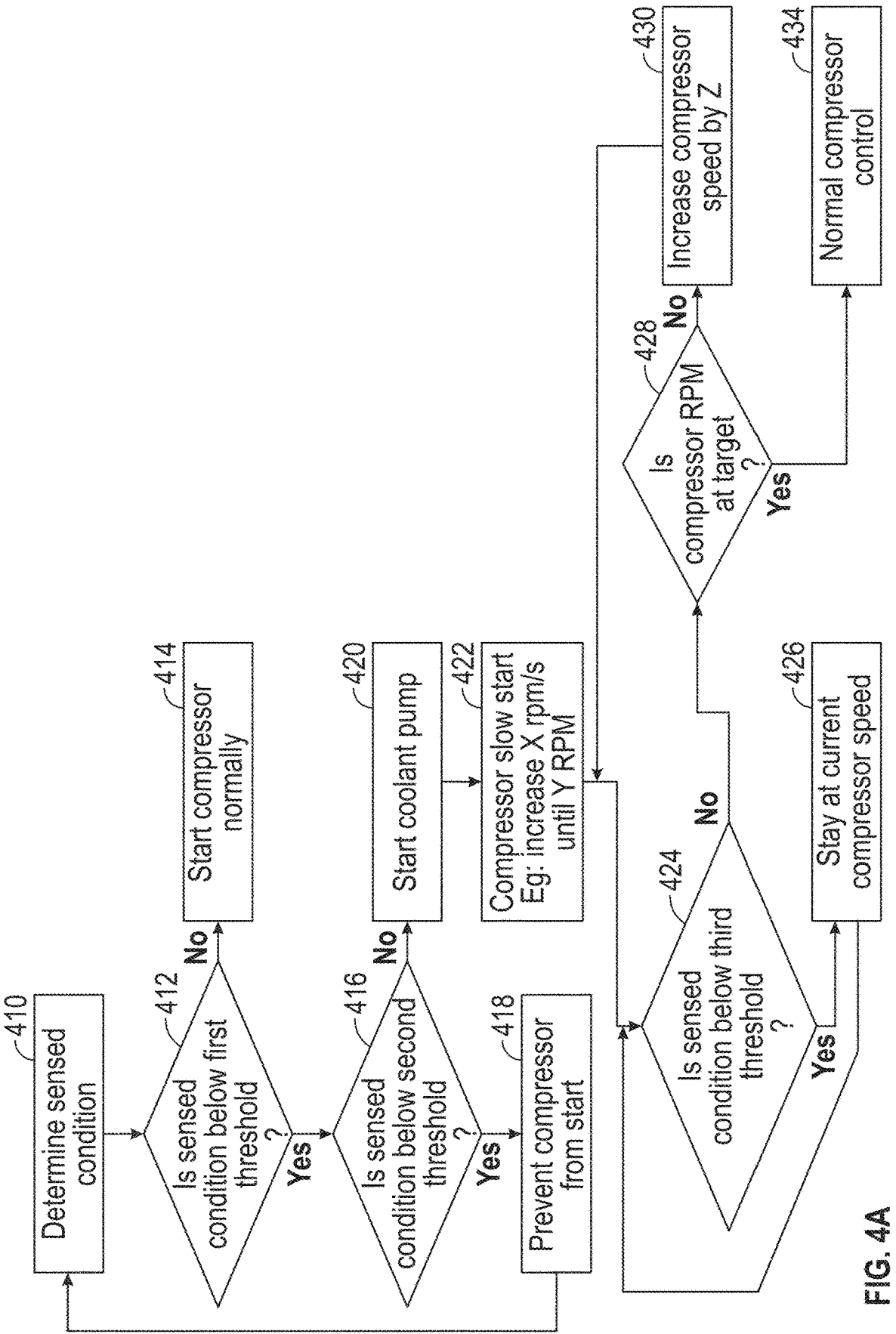
FIG. 4A is a flowchart of a first method for operating the system using a third temperature threshold.

Referring now to FIG. 4A, a flowchart of a method of operating the system is set forth. In the following method, the system prevents the undershoot of the refrigerant temperature at the compressor start. Because the refrigerant on the low side of the compressor will be lower than ambient, the heat mass in the chiller loop is used to prevent the refrigerant temperature from undershoot. As described below, the coolant pump may be started at the same time as the compressor so that the refrigerant can absorb heat from the coolant at the first heat exchanger or chiller and prevent the refrigerant from having temperature undershoot. The higher the coolant temperature, the better the effect of preventing undershoot.

In step 410, an extreme cold condition may be sensed by a sensed condition. In one example the sensed condition is a temperature is determined within the refrigerant loop from one of the temperature sensors 262, 268 or the temperature in the coolant loop at the temperature sensor 226. In one example, as mentioned above, the temperature signal from the temperature sensor 262 located within the housing of the compressor 214 or temperature sensor 262 may be used. The ambient temperature sensor 264 may also be used to sense an extreme cold condition. Likewise, pressure sensor 263 may be used to determine the extreme cold sensed condition directly or by using the sensed pressure to determine a saturation temperature from the pressure signal. In step 412, the controller compares the sensed condition to a first threshold. That is, step 412 determines whether the sensed condition is below a first threshold. One example of a first threshold is −25 C. As mentioned above, the system minimizes undershoot. If the temperature is not too cold, undershoot does not matter. In step 412, it should be noted that the first threshold is used to activate the system. That is, when the sensed condition is higher than the first threshold, the system need not act at step 412 and step 414 starts the compressor normally.

In step 412 when the sensed condition is below the first threshold, step 416 determines whether the system is below a second threshold such as −40 C, when temperature is the sensed condition. The compressor is prevented from starting in step 418 when the compressor temperature is below the second threshold. The system then returns to step 410.

In step 416, when the sensed condition is not below the second threshold, the coolant pump is started when the vehicle starts in step 420. The controller starts the flow by controlling the coolant pump. In step 422, the compressor starts operation when the vehicle starts. That is, the controller starts the flow of refrigerant by starting the compressor. Step 422 allows a slow compressor start such as by increasing the speed by X rpm/second until Y rpms are reached. Steps 420 and 422 may be performed simultaneously. The compressor will start when the cutoff temperature (the second threshold) of the compressor has not been reached. That is, the compressor will start when the sensed condition is above the second threshold described above. The coolant in the coolant loop is warmed with the coolant pump. That is, the coolant pump acts as a waste heat source and warms the coolant within the coolant loop.

After step 422, step 424 determines whether the sensed condition is below a third threshold (such as −33 C when temperature is used). When the sensed condition is below a third threshold, the compressor stays at the current compressor speed in step 426. Thereafter, step 424 is performed again. Referring back to step 424, when the sensed condition is not below a third threshold, step 428 determines whether the compressor speed is at a target speed. When the compressor is not at a target speed, step 430 increases the compressor speed by Z, which corresponds to a preset incremental speed increase. After step 430, step 424 is again performed.

Referring back to step 428, when the compressor speed is at the target speed, the extreme cold start operation is finished, and the compressor is controlled normally in step 434.

Figure 4B:
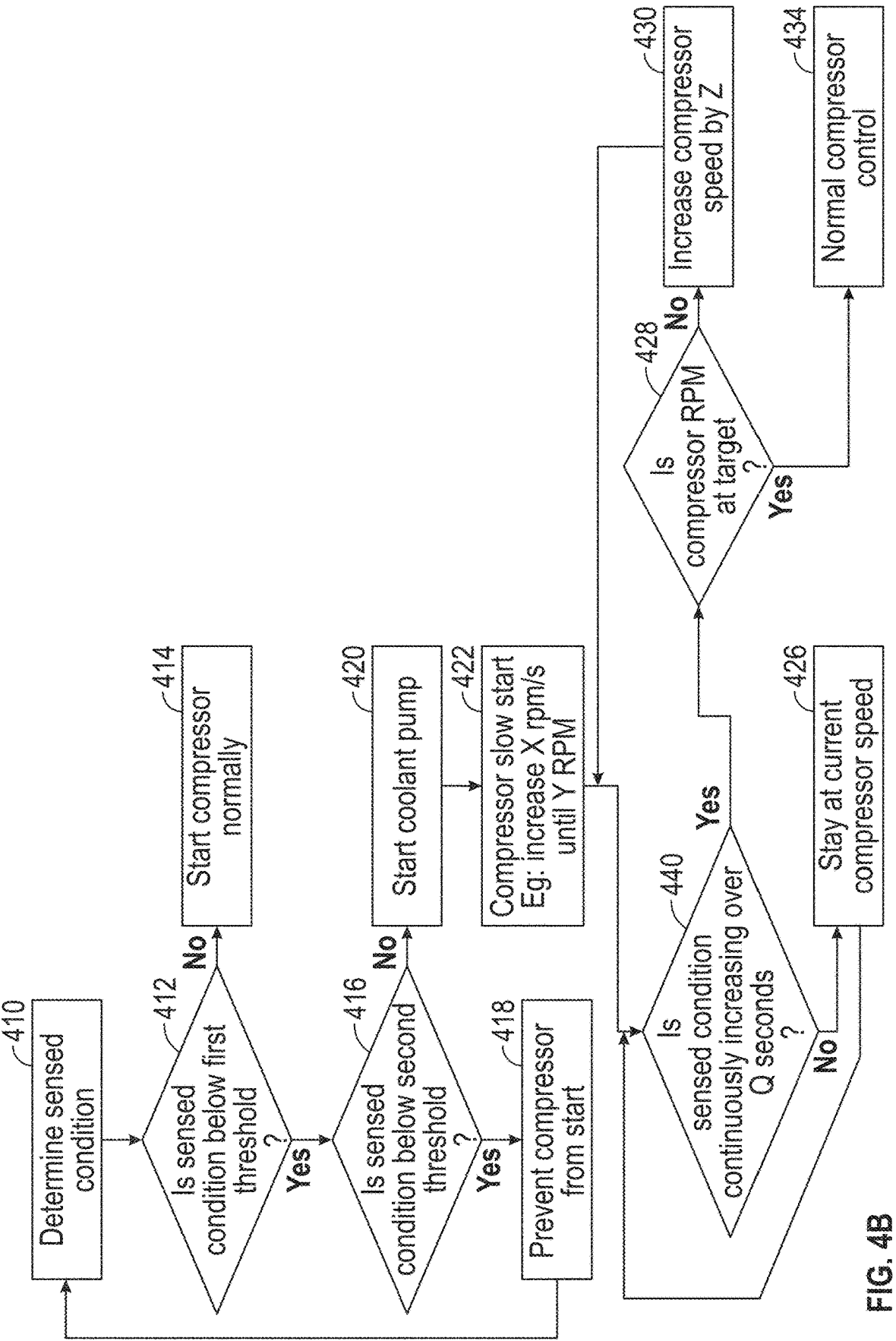
FIG. 4B is a flowchart of a second method for operating the system when the temperature is continuously increasing over a time period.

Referring now to FIG. 4B, steps 410-422 of FIG. 4A are performed and therefore not described further. After step 422, step 440 determines whether the sensed condition is continuously increasing over a period of Q seconds, where Q is determined by suitable testing during development. If the sensed condition is not increasing for more than Q seconds in step 440, step 426 maintains the current compressor speed as described above in FIG. 4A. Thereafter, step 440 is performed again. When the sensed condition is continuously increasing over the second threshold, steps 428-434 are performed in the same manner as described above in FIG. 4A.

Figure 4C:
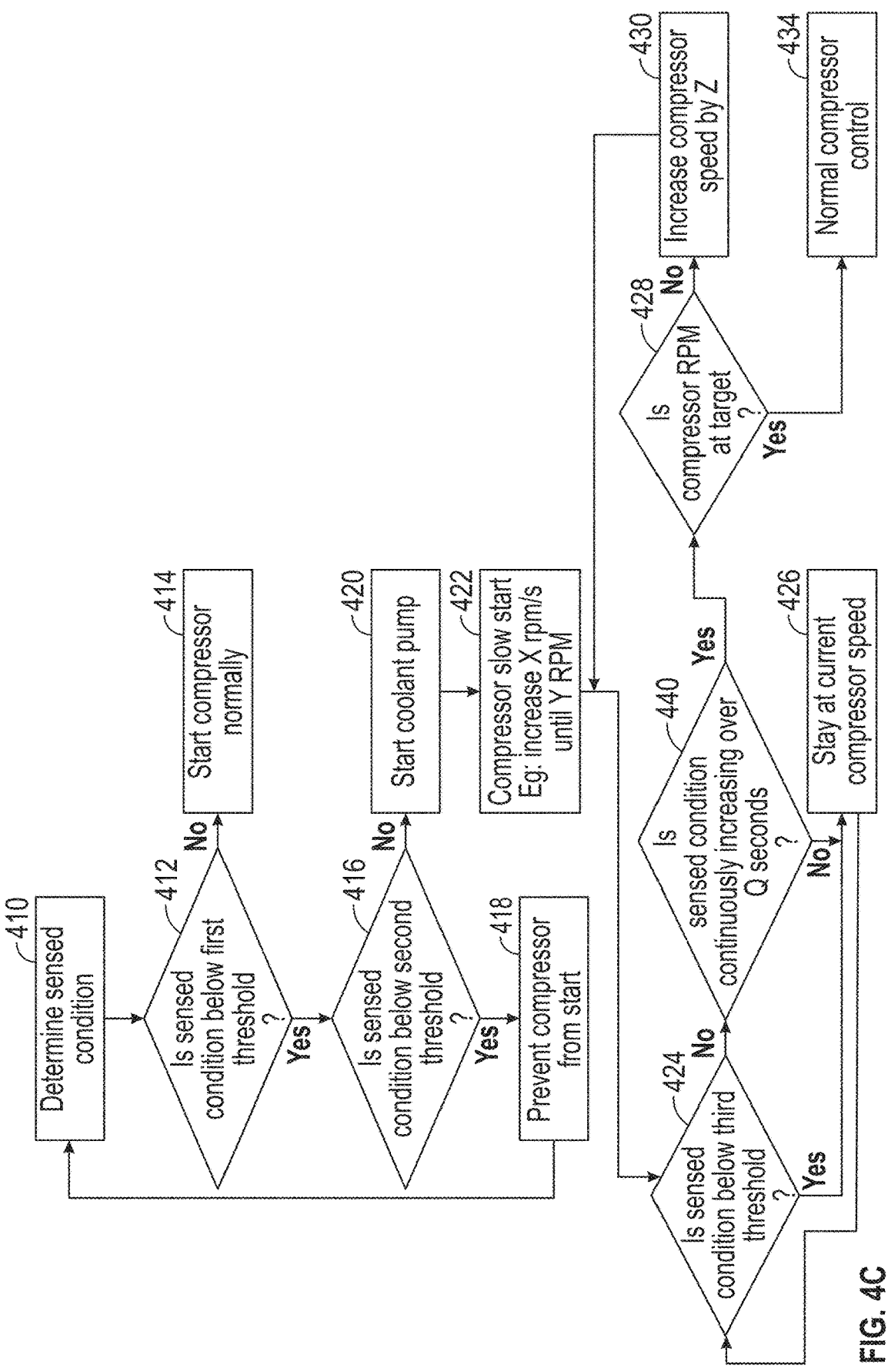
FIG. 4C is a flowchart of a method for operating a system using a third threshold and determining the temperature is continuously increasing over the time period.

Referring now to FIG. 4C, the flowchart is a combination of the flowcharts of FIGS. 4A and 4B. That is, steps 410-422 are the same. After step 422, step 424 determines if the sensed condition is below a third threshold. If no, step 440 is executed in which it is determined whether the sensed condition at the is continuously increasing over Q seconds. When step 440 is true, steps 428-434 are executed. If either 424 is true or 440 is false, step 426 is performed. Thereafter, step 424 is performed again. Steps 426-434 were described above and therefore their descriptions are not repeated.

Figure 5A:
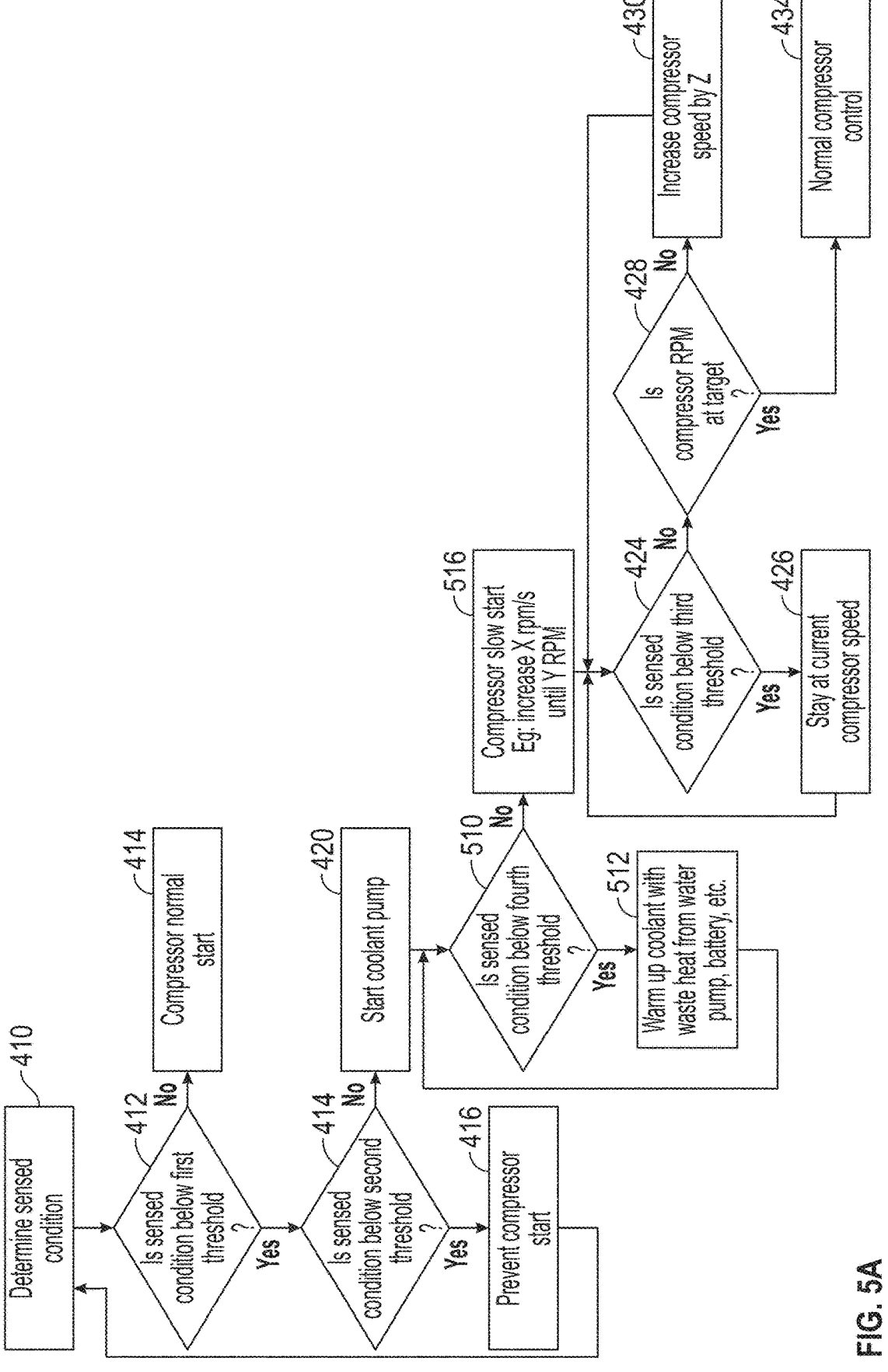
FIG. 5A is a flowchart of a first method of operating the system using waste heat and a third threshold.

Referring now to FIG. 5A, waste heat may also be utilized during the process. That is, the coolant pump will generate heat during the operation and the coolant will absorb the waste heat. Other sources of waste heat may be used including from the battery and other sources. The waste heat may be used to warm up the coolant, and once the compressor starts, the refrigerant can absorb heat from the coolant to reduce the temperature undershoot. As mentioned above, the waste heat source may be the vehicle battery. In certain vehicles, the vehicle battery may be programmed to maintain a certain temperature, or an active heater may be used to actively warm up the coolant. The system in FIG. 5A works when the waste heat generated by the coolant pump, or any heat source provides waste heat that is greater than the heat loss of the coolant flow path.

FIG. 5A uses steps 410-420 of FIG. 4A and therefore will not be described again. After step 420, step 510 determines whether the sensed condition is below a fourth threshold. When the sensed condition is below a fourth temperature threshold (such as −35 C when temperature is the sensed condition), step 512 warms the coolant with waste heat from a waste heat source or heat mass 224. After step 512, step 510 is again performed.

In step 510, when the sensed condition is not below a fourth threshold, step 516 performs a slow start by increasing the speed of the compressor by X rpms per second under Y rpms are reached. After step 516, Step 424-434 are performed and are identical to those set forth in FIG. 4A.

Figure 5B:
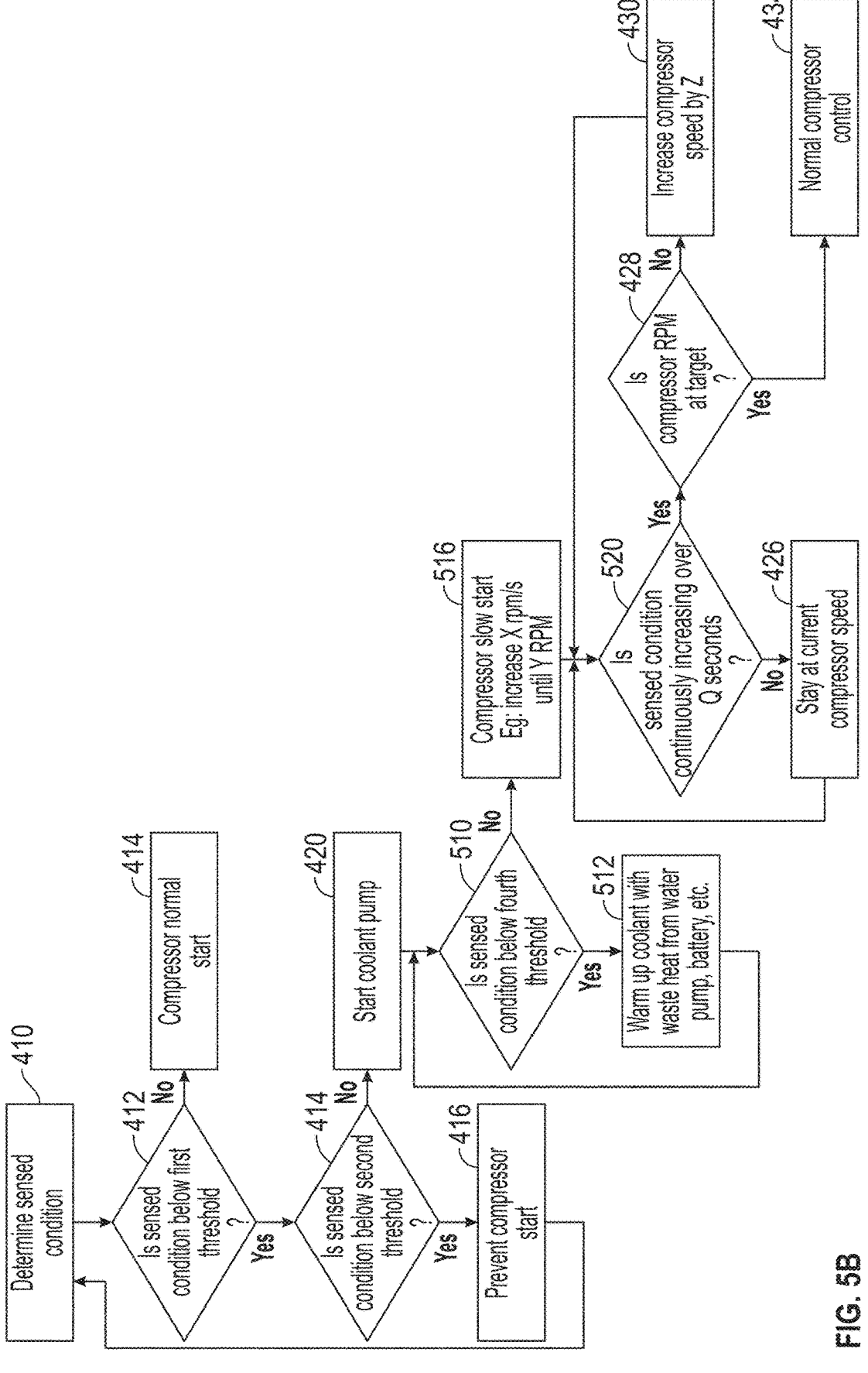
FIG. 5B is a flowchart of a second method for operating the system.

Referring now to FIG. 5B, a similar process to that set in FIG. 5A is provided. Steps 410-516 are identical. When the sensed condition is not below the fourth threshold, step 516 slowly starts the compressor as described above in step 516 of FIG. 5A. However, thereafter, step 520 determines whether the sensed condition is continuously increasing over Q seconds. When the sensed condition is not increasing continuously over the seconds, step 426 is performed so that the compressor speed is maintained at the current speed. When the sensed condition is increasing continuously over Q seconds, steps 428-434 are performed as described above. It should be noted that the method set forth in FIGS. 5A and 5B may also help speed up the hot gas bypass circuit 250. The system uses the compressor as a heat source and operates at an elevated suction pressure while the ambient temperature is below, for example, OC and the normal heat pump system suction pressure is less than 0.3 MPaA. At the cold start of such operation, the system quickly pumps up the suction pressure to its ideal operating condition and during this process, the refrigerant absorbs heat from the pre-warm coolant to accelerate the process and reach the ideal operating conditions faster. The system works to improve the warmup speed only when the chiller coolant temperature warms up faster by waste heat than the refrigerant itself, which depends on the waste heat heating power and the coolant loop total heat mass. When the refrigerant temperature increases much faster than the coolant and the refrigerant loses energy to the coolant, the warmup speed may be delayed.

Figure 6:
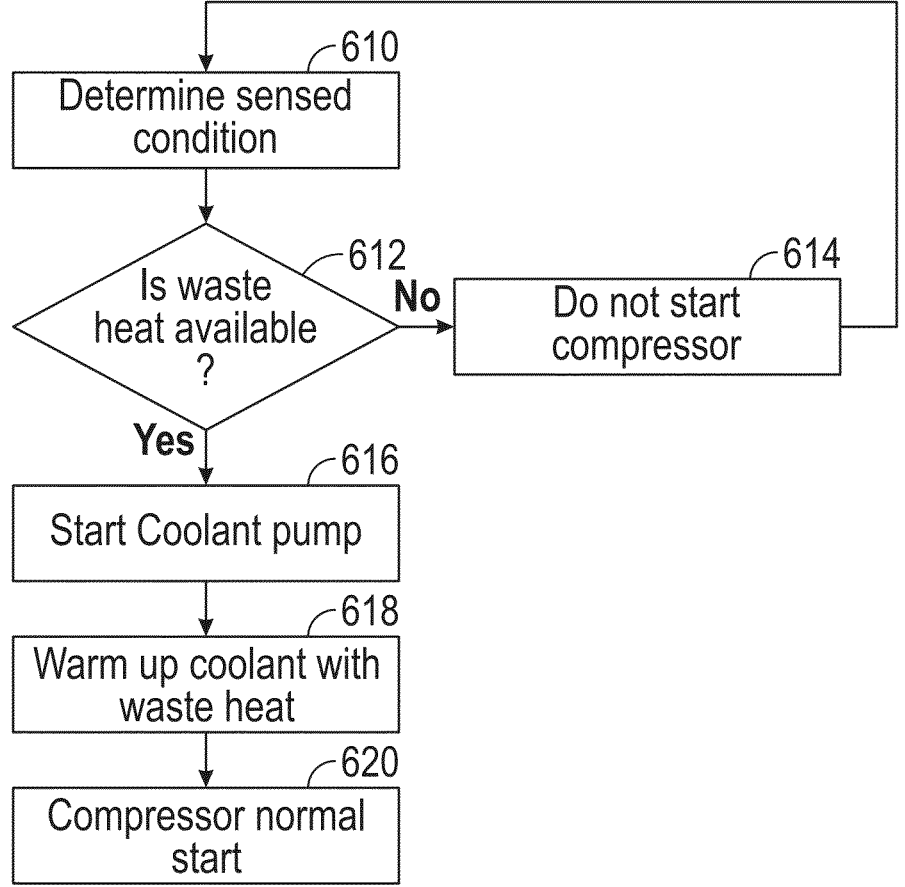
FIG. 6 is a flowchart of a method for operating the system when waste heat is available to aid the warmup process.

Referring now to FIG. 6, the process for starting the compressor is set forth using waste heat. In step 610, the sensed condition at the coolant loop is determined. In step 612, if waste heat is not available and the temperature is too cold, the compressor is not started. In step 612, if waste heat is available, the coolant pump is started in step 616. The coolant is warmed up with the waste heat in step 618. Thereafter, the compressor starts normally to circulate the coolant with the waste heat absorbed therein in step 620.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

As used herein, the phrase at least one of A, B, and C should be construed to mean a logical (A OR B OR C), using a non-exclusive logical OR. For example, the phrase at least one of A, B, and C should be construed to include any one of: (i) A alone; (ii) B alone; (iii) C alone; (iv) A and B together; (v) A and C together; (vi) B and C together; (vii) A, B, and C together. The phrase at least one of A, B, and C should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" or the term "controller" may refer to, be part of, or include processor hardware (shared, dedicated, or group) that executes code and memory hardware (shared, dedicated, or group) that stores code executed by the processor hardware.

The module or controller may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module or controller may communicate with other modules or controllers using the interface circuit(s). Although the module or controller may be depicted in the present disclosure as logically communicating directly with other modules or controllers, in various implementations the module or controller may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module or controller may be distributed among multiple modules that are connected via the communications system. For example, multiple modules may implement the same functionality distributed by a load balancing system. In a further example, the functionality of the module or controller may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules or controllers. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A method of operating a vehicle comprising:
determining a sensed condition at the vehicle;
when the sensed condition is below a first threshold and above a second threshold, the second threshold being less than the first threshold, starting a flow of coolant around a coolant loop comprising a first portion of a first heat exchanger and a heat mass of the vehicle; and
starting a flow of refrigerant around a refrigerant loop fluidically separated from the coolant loop by starting a compressor within the refrigerant loop at a first speed and circulating the refrigerant back to the compressor through the first heat exchanger.

2. The method of claim 1 further comprising controlling a speed of the compressor based on the sensed condition.

3. The method of claim 1 further comprising increasing a speed of the compressor above the first speed based on the sensed condition continuously increasing.

4. The method of claim 1 further comprising increasing a speed of the compressor above the first speed based on a continuously increasing the sensed condition until a target speed is reached.

5. The method of claim 1 further comprising increasing a speed of the compressor when the sensed condition meets a predetermined condition.

6. The method of claim 1 wherein starting the flow of refrigerant is performed simultaneously with or after starting the flow of coolant.

7. The method of claim 1 further comprising increasing a speed of the compressor when a refrigerant temperature is above a third threshold and the refrigerant temperature is increasing over a time period.

8. The method of claim 1 wherein determining the sensed condition comprises determining the sensed condition at the refrigerant loop by determining at least one of: a temperature within the compressor, a temperature within a coolant conduit, a temperature within a refrigerant conduit, an ambient temperature, and a refrigerant pressure.

9. The method of claim 1 further comprising raising a temperature of the coolant from a heat source to form heated coolant; and
heating refrigerant in the refrigerant loop at a first heat exchanger from the heated coolant.

10. The method of claim 9 wherein raising the temperature of the coolant comprises at least one of raising the temperature of the coolant from a waste heat source, raising the temperature of the coolant from a coolant pump, raising the temperature of the coolant from a waste heat source and a coolant pump, and raising the temperature of the coolant from a battery housing and a coolant pump.

11. A method comprising:
determining a refrigerant temperature;
when the refridgement temperature is below a first threshold and above a second threshold, the second threshold being less than the first threshold, starting a flow of coolant in a coolant loop comprising a first portion of a first heat exchanger; and
starting a flow of refrigerant in a refrigerant loop by starting a compressor within the refrigerant loop at a first speed; and
increasing a speed of the compressor when the refrigerant temperature is above a third threshold between the first threshold and the second threshold.

12. A method comprising:
determining a sensed condition;
when the sensed condition is below a first threshold and above a second threshold, the second threshold being less than the first threshold, starting a flow of coolant in a coolant loop comprising a first portion of a first heat exchanger;

starting a flow of refrigerant in a refrigerant loop by starting a compressor within the refrigerant loop at a first speed;

communicating refrigerant from the compressor through a second heat exchanger; and communicating coolant to the second heat exchanger in a second coolant loop fluidically coupled to the coolant loop.

13. A system for a vehicle comprising:

a sensed condition sensor sensing a sensed condition at the vehicle;

a coolant loop comprising a first portion of a first heat exchanger and a heat mass of the vehicle;

a refrigerant loop comprising a compressor; and a controller programmed to, start a flow of coolant around the coolant loop when the sensed condition is below a first threshold and above a second threshold, the second threshold being less than the first threshold; and start a flow of refrigerant around the refrigerant loop fluidically separated from the coolant loop by starting the compressor within the refrigerant loop at a first speed and circulating the refrigerant back to the compressor through the first heat exchanger.

14. The system of claim 13 wherein the controller is programmed to increase a speed of the compressor above the first speed based on a continuously increasing sensed condition.

15. The system of claim 13 wherein the controller is programmed to increase a speed of the compressor above the first speed based on a continuously increasing sensed condition until a target speed is reached.

16. The system of claim 13 wherein the controller is programmed to increase a speed of the compressor when the sensed condition meets a predetermined condition.

17. The system of claim 13 wherein the controller is programmed to increase a speed of the compressor when a refrigerant temperature is above a third threshold and the refrigerant temperature is increasing over a time period.

18. The system of claim 13 wherein the sensed condition sensor comprises at least one of an ambient temperature sensor, a refrigerant pressure sensor, a compressor temperature sensor, a refrigerant conduit temperature sensor and a coolant conduit temperature sensor.

19. The system of claim 13 further comprising a heat source fluidically coupled to the coolant forming heated coolant; and a first heat exchanger heating refrigerant in the refrigerant loop from the heated coolant.

20. A system comprising:

a sensed condition sensor sensing a refrigerant temperature;

a coolant loop comprising a first portion of a first heat exchanger;

a refrigerant loop comprising a compressor; and a controller programmed to determine a sensed condition;

start a flow of coolant in when the sensed condition is below a first threshold and above a second threshold, the second threshold being less than the first threshold;

start a flow of refrigerant in the refrigerant loop by starting the compressor within the refrigerant loop at a first speed; and increase a speed of the compressor when the refrigerant temperature is above a third threshold between the first threshold and the second threshold.

* * * * *